J. T. FULCHER.
COMBINED AEROPLANE AND HELICOPTER.
APPLICATION FILED AUG. 6, 1920.
1,418,248.
Patented May 30, 1922.
5 SHEETS—SHEET 2.
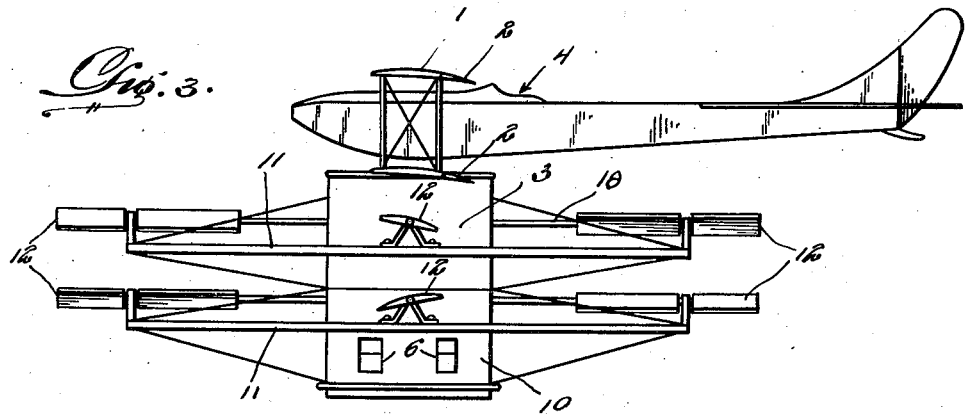
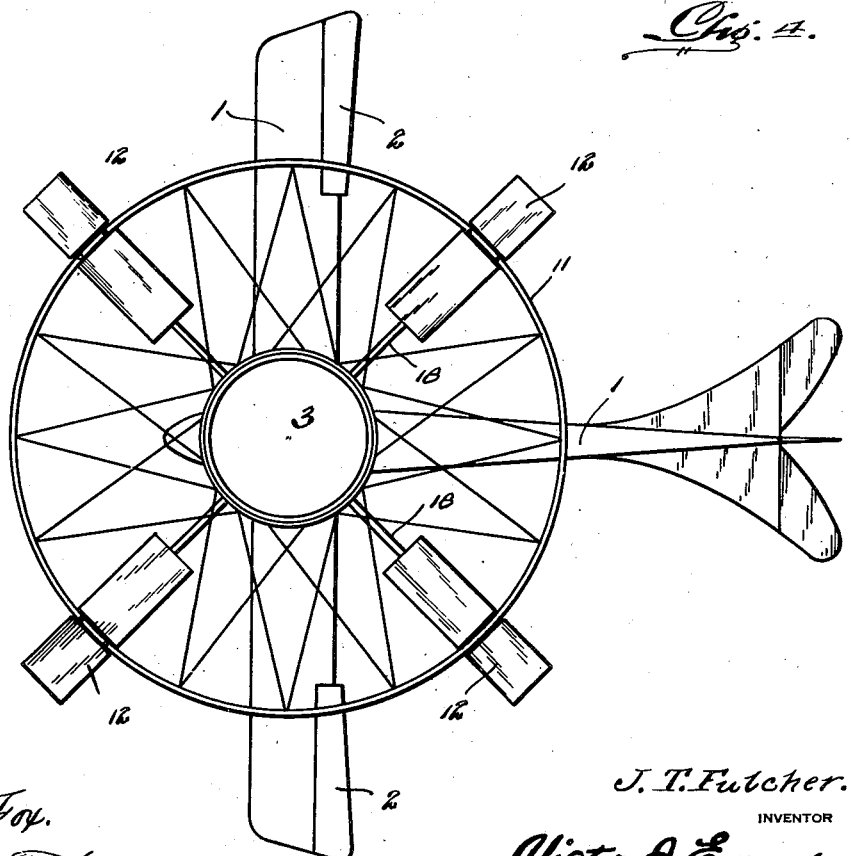

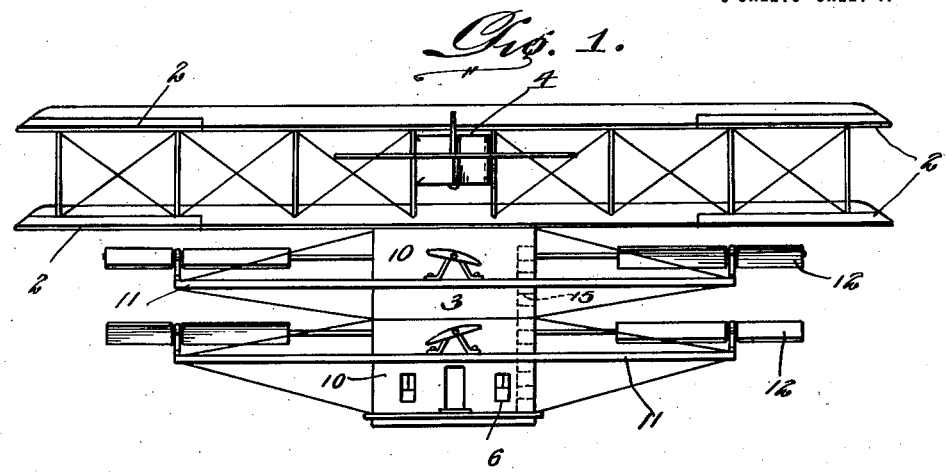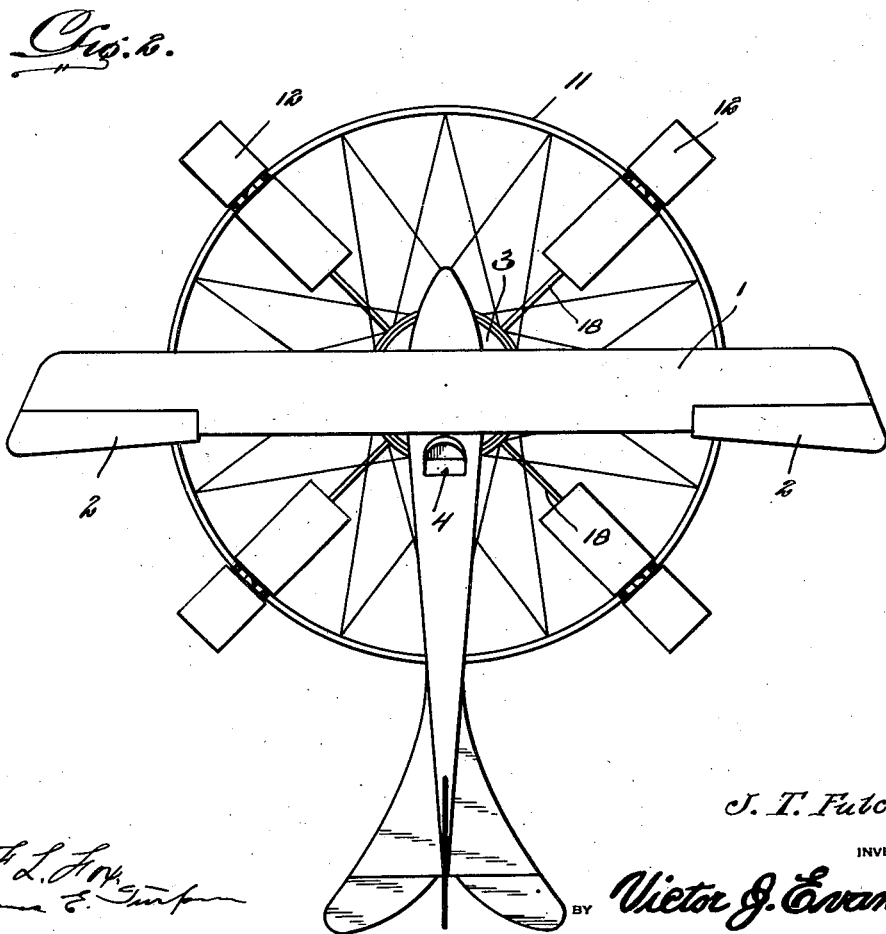

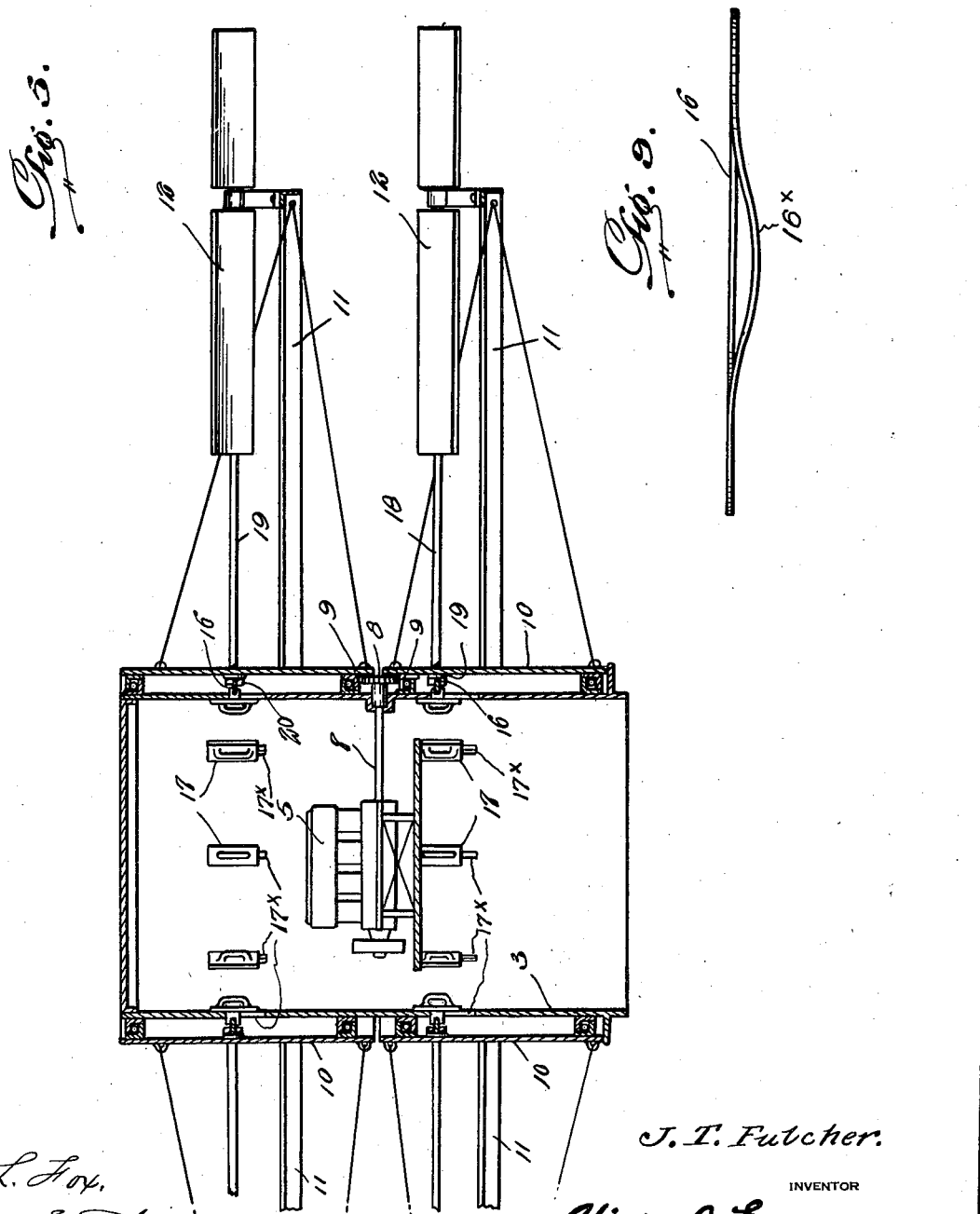

J. T. FULCHER.
COMBINED AEROPLANE AND HELICOPTER.
APPLICATION FILED AUG. 6, 1920.

1,418,248.

Patented May 30, 1922.

J. T. Fulcher,
INVENTOR

BY Victor J. Evans.
ATTORNEY

WITNESSES:

J. T. FULCHER.
COMBINED AEROPLANE AND HELICOPTER.
APPLICATION FILED AUG. 6, 1920.
1,418,248.
Patented May 30, 1922.
5 SHEETS—SHEET 5.
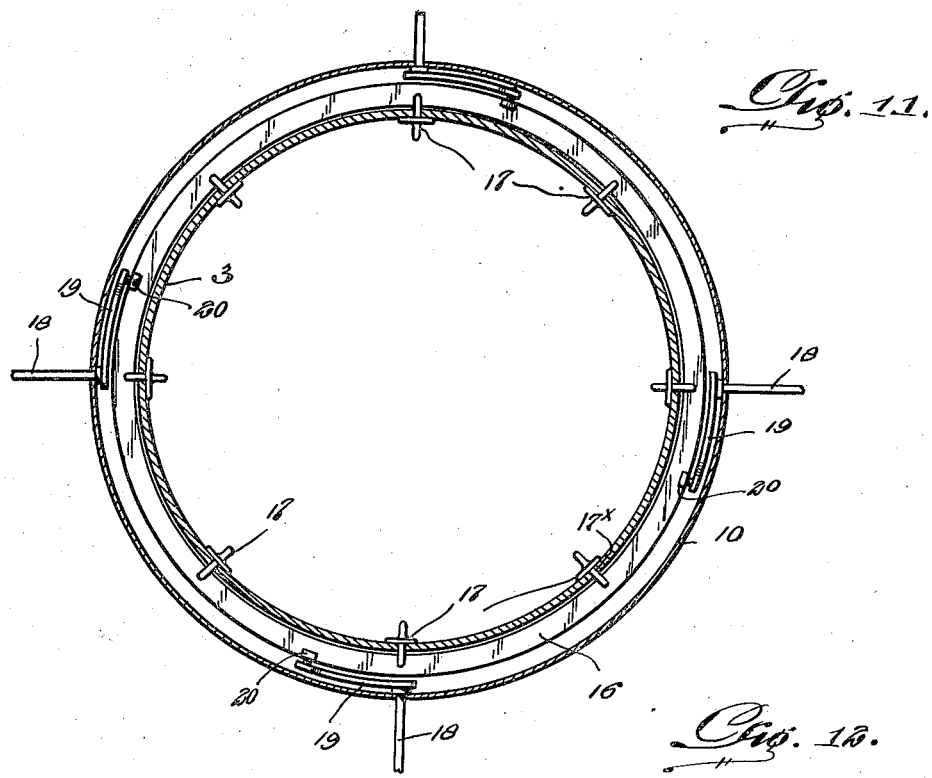
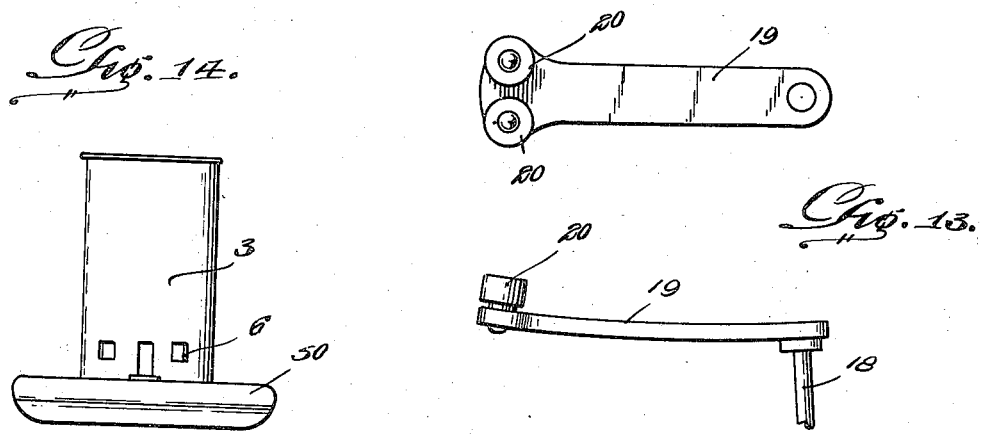
J. T. Fulcher.
INVENTOR
BY Victor J. Evans.
ATTORNEY
WITNESSES:

UNITED STATES PATENT OFFICE.

JOSEPH THOMAS FULCHER, OF GUNTERSVILLE, ALABAMA.

COMBINED AEROPLANE AND HELICOPTER.

1,418,248. Specification of Letters Patent. Patented May 30, 1922.

Application filed August 6, 1920. Serial No. 401,653.

*To all whom it may concern:*

Be it known that I, JOSEPH THOMAS FULCHER, a citizen of the United States, residing at Guntersville, in the county of Marshall and State of Alabama, have invented new and useful Improvements in Combined Aeroplanes and Helicopters, of which the following is a specification.

One object of my present invention is the provision of a combined helicopter and aeroplane that is balanced in every direction and is therefore stable in flight, and one having the capacity of rising from a landing on a piece of ground only slightly larger in area than the machine.

Another object of the invention is the provision of a flying machine of helicopter type in which the propeller blades are adjustable in order to increase or decrease the pitch of the same at any given point of rotation, thereby enabling the aviator to drive the machine in any direction from a standstill.

Another object is the provision of a combined aeroplane and helicopter in which the aeroplane affords an additional safety factor and at the same time contributes to the stability of the machine in flight and renders it easier for the aviator to control the machine.

Other objects and particular advantages of the invention will be fully understood from the following description and claims when the same are read in connection with the drawings accompanying and forming part of this specification, in which:—

Figure 1 is a rear elevation of the combined aeroplane and helicopter constituting the best practical embodiment of my invention known to me.

Figure 2 is a top plan view of the same.

Figure 3 is a side elevation of the combination machine.

Figure 4 is an inverted plan view of the machine.

Figure 5 is a diametrical section of the machine, taken in a plane extending through the wings or planes of the aeroplane structure.

Figure 6:
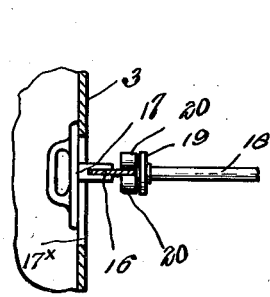
Figure 7:
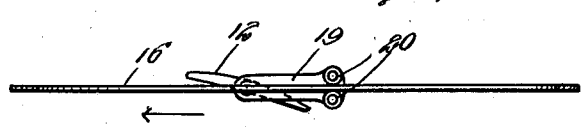
Figure 8:
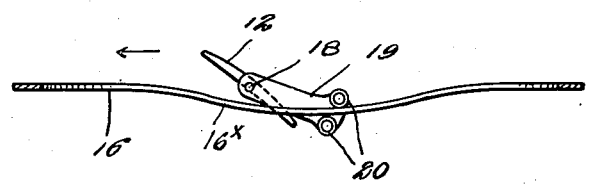
Figure 10:
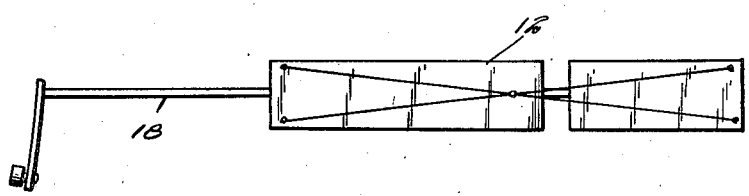

Figures 6, 7, 8, 9, 10, 11, 12, and 13 are detail views hereinafter explicitly referred to.

Figure 14 is a detail view illustrative of a modification.

Similar numerals designate corresponding parts in Figures 1 to 14 to which reference will first be had.

The aeroplane construction 1 is preferably of the bi-plane type, and it is provided with ailerons 2 and is otherwise by preference of the ordinary well known construction. It is to be understood, however, that the said aeroplane 1 is minus a propeller and a motor therefor; the combination machine being propelled by the propelling wheels of the helicopter which derive their motion from the motor complementary to the helicopter as hereinafter described and definitely claimed.

The aeroplane 1 surmounts the helicopter, and the cylindrical body 3 of the helicopter is arranged centrally of the aeroplane; the said body 3 being hollow and upright, and being formed of any material or materials possessed of the requisite strength and lightness. A portion at least of the lower end of the body 3 is open so that while the machine is maintained at a point above the ground and against movement in any direction, a passenger may be lowered from or elevated into the body 3.

In the practical use of my combination machine the aviator is located at the point indicated by 4 in Figure 1 so as to give him control of the elements of the aeroplane as well as control of the motor 5 of the helicopter, the said motor 5 being carried within the body 3 which is also adapted to carry the cargo and passengers. The cargo space and the passenger accommodations are located as shown below the motor 5, and windows 6 are provided in the lower portion of the body 5 in order to enable the passengers to view the scenery when the machine is in flight. The motor 5 is preferably of the internal combustion type, and is arranged in the vertical center of the body 3. The drive shaft 7 of the motor is horizontally disposed, and is equipped with a gear 8. This gear 8 is arranged to drive in opposite direction two opposite racks 9. The racks 9 are fixedly connected to drums 10 of aluminum or other light material or materials. The drums 10 constitute the hubs of two large wheels 11 which may be properly described as in general of bicycle-wheel construction. Each wheel 11 carries a number of, preferably four, radially extending and equidistant propeller blades 12. Manifestly when the wheels 11 are revolved in opposite directions at a high rate of speed they will serve to maintain the apparatus at rest in the air. Consequently the machine will not be liable to be affected by air currents, and its stability will permit of movement of the passengers in the body 3 or shifting of the cargo when occasion demands. In order to enable the passengers to conveniently reach the top of the body 3, I prefer to provide a stairway 15 in the said body 3. An important feature of my invention resides in the means provided for the control of the propeller blades 12. The control means for each set of blades 12 comprises an annulus 16 capable of being turned about the body 3 and having a deflected portion 16×, Figures 8 and 9, brackets 17 supporting the annulus 16 and capable of being moved to change the pitch of the annulus, and the construction shown in Figures 6 to 14, associated with the annulus 16 and the rock shafts 18 of the propeller blades. The construction alluded to includes curvilinear cranks 19 on the rock shafts 18 and equipped with anti-friction wheels 20 and the adjusting means best shown in Figure 6; the said means being operable from the inside of the body 3. By virtue of these provisions it will be manifest that with the machine in horizontal position in the air and all of the propeller blades 12 balanced, the machine will stand still provided there are no air currents to move it. The connections between the annuli 16 and the brackets 17 are disposed in vertical slots 17× in the body 3. It will also be noticed that the said brackets 17 are provided with handles 40 to facilitate manipulation thereof. By moving the brackets at the right and the left downwardly the propeller blades that pass said points will be deflected and the machine will be driven downwardly. This combination is brought about by movement of the upper right hand and lower left hand brackets 17, but if the aviator moves the lower right hand and upper left hand brackets the machine will be moved rearwardly. Therefore with all of the brackets the aviator is enabled to control the machine so as to stand still in the air or to move at a greater or less speed in any direction. It will also be understood that by increasing the speed of the engine or pitch of the propeller blades the machine will be enabled to rise at a great rate of speed and with a heavy load.

An important feature of my invention resides in the provision made whereby the aviator is enabled to shift the propeller blades 12 at any time and at any particular point of rotation while the machine is in flight; and another important feature is the relative arrangement of the motor, and the direct connections between the same and the sets of propeller blades 12.

It will be apparent from the foregoing that it is within the purview of my invention to carry a regular aeroplane equipment at the top of the helicopter body 3; and it will also be apparent by reference to Figure 14 that when desired the helicopter body 3 may be provided at its lower end with a combination cushion and float 50, designed to absorb the shock when the machine lands on terra-firma, and to increase the floatability of the machine when it drops in the water.

Having described my invention, what I claim and desire to secure by Letters-Patent, is:—

1. In a flying machine, an upright hollow body of cylindrical form having vertical slots, a motor arranged in the vertical center of the body and having a horizontal drive shaft and a spur gear at the outer end thereof and exteriorly of the body, lower and upper annular drums surrounding and spaced from the body and provided above and below said spur gear with annular racks intermeshed with the same, upper and lower wheels surrounding and carried by said drums, radial rock shafts journaled in said wheels and carrying blades, curvilinear cranks fixed on the inner ends of said rock shafts and arranged at the inner sides of the drums and each carrying spaced anti-friction wheels, adjustable annuli surrounding the body and extending between the anti-friction wheels of said cranks, and vertically-movable manually adjustable brackets arranged at the inner side of the body and connected with said annuli to deflect the same, the connections being disposed and movable in the vertical slots of the body.

2. In a flying machine, an upright hollow body of cylindrical form having vertical slots, a motor arranged in the vertical center of the body and having a horizontal drive shaft and a spur gear at the outer end thereof and exteriorly of the body, lower and upper annular drums surrounding and spaced from the body and provided above and below said spur gear with annular racks intermeshed with the same, upper and lower wheels surrounding and carried by said drums, radial rock shafts journaled in said wheels and carrying blades, curvilinear cranks fixed on the inner ends of said rock shafts and arranged at the inner sides of the drums and each carrying spaced anti-friction wheels, adjustable annuli surrounding the body and extending between the anti-friction wheels of said cranks, and vertically-movable manually adjustable brackets arranged at the inner side of the body and connected with said annuli to deflect the same, the connections being disposed and movable in the vertical slots of the body, in combination with an aeroplane surmounting and connected to the body, and a combined cushion and float connected to and arranged below the lower end of the body.

In testimony whereof I affix my signature.

JOSEPH THOMAS FULCHER.